(12) United States Patent
Priebatsch

(10) Patent No.: US 9,530,289 B2
(45) Date of Patent: *Dec. 27, 2016

(54) PAYMENT PROCESSING WITH AUTOMATIC NO-TOUCH MODE SELECTION

(71) Applicant: Seth Priebatsch, Boston, MA (US)

(72) Inventor: Seth Priebatsch, Boston, MA (US)

(73) Assignee: SCVNGR, INC., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/283,771

(22) Filed: May 21, 2014

(65) Prior Publication Data

US 2015/0014413 A1    Jan. 15, 2015

Related U.S. Application Data

(63) Continuation of application No. 13/939,434, filed on Jul. 11, 2013, now Pat. No. 8,770,478.

(51) Int. Cl.
| | |
|---|---|
| *G06K 15/00* | (2006.01) |
| *G07G 1/00* | (2006.01) |
| *G06Q 90/00* | (2006.01) |
| *G06K 7/08* | (2006.01) |
| *G06Q 20/32* | (2012.01) |

(52) U.S. Cl.
CPC ............. *G07G 1/0045* (2013.01); *G06K 7/08* (2013.01); *G06Q 20/3274* (2013.01); *G06Q 90/00* (2013.01)

(58) Field of Classification Search
USPC ................. 235/383, 380, 381; 705/14.23
See application file for complete search history.

(56) References Cited

U.S. PATENT DOCUMENTS

| | | |
|---|---|---|
| D38,205 S | 8/1906 | Alexander |
| D104,560 S | 5/1937 | Chamberlain |
| D127,030 S | 5/1941 | Bettcher |
| D154,818 S | 8/1949 | Strauss |
| D164,158 S | 8/1951 | Clay |
| D169,369 S | 4/1953 | Forrester |

(Continued)

FOREIGN PATENT DOCUMENTS

| | | |
|---|---|---|
| CN | 101593197 A | 12/2009 |
| CN | 102254264 A | 11/2011 |

(Continued)

OTHER PUBLICATIONS

Bichsel et al., "Data-Minimizing Authentication Goes Mobile", Lecture Notes in Computer Science, vol. 7394, 2012, pp. 55-71.

(Continued)

*Primary Examiner* — Ahshik Kim
(74) *Attorney, Agent, or Firm* — Morgan, Lewis & Bockius LLP

(57) ABSTRACT

A "no-touch" mobile checkout experience frees consumers from the need to manually locate and activate a mobile payment application in order to complete a transaction. The consumer simply brings his mobile device within close range of an interface console, which in various embodiments prompts the device to launch an application that causes display of a payment token without user action. If the consumer's device is not NFC-capable, the interface console can read a displayed token optically in the usual fashion.

9 Claims, 6 Drawing Sheets

(56) References Cited

U.S. PATENT DOCUMENTS

| | | |
|---|---|---|
| D173,647 S | 12/1954 | Elle et al. |
| D180,734 S | 8/1957 | Hirose |
| D180,887 S | 8/1957 | Weinstein |
| D181,019 S | 9/1957 | Parcher |
| D181,589 S | 12/1957 | Kellock et al. |
| D184,351 S | 2/1959 | Grosso |
| D199,598 S | 11/1964 | Lanigan |
| D210,281 S | 2/1968 | Specht |
| D213,446 S | 3/1969 | Sabella |
| D215,035 S | 8/1969 | Steinbach |
| 3,748,765 A | 7/1973 | Bass et al. |
| D240,460 S | 7/1976 | Simonelli |
| D240,609 S | 7/1976 | Schwartz |
| D245,934 S | 9/1977 | Donaldson |
| D249,527 S | 9/1978 | Stralka |
| D252,932 S | 9/1979 | Felder |
| D254,602 S | 4/1980 | Gess |
| D255,455 S | 6/1980 | Gensike et al. |
| D260,096 S | 8/1981 | Overman et al. |
| D268,029 S | 2/1983 | Fisher |
| D268,590 S | 4/1983 | Miller et al. |
| D270,644 S | 9/1983 | Kinney |
| D276,618 S | 12/1984 | Hanke |
| D280,103 S | 8/1985 | Bonnefoy |
| D290,708 S | 7/1987 | Rea |
| D295,413 S | 4/1988 | Nakamura et al. |
| D310,359 S | 9/1990 | Inukai |
| D316,707 S | 5/1991 | Allegeier |
| D323,894 S | 2/1992 | Rosati et al. |
| D325,729 S | 4/1992 | Forsythe et al. |
| D327,878 S | 7/1992 | Fukutake et al. |
| 5,140,141 A | 8/1992 | Inagaki et al. |
| 5,198,650 A | 3/1993 | Wike, Jr. |
| D334,896 S | 4/1993 | Shimizu et al. |
| D344,745 S | 3/1994 | Miyazawa |
| D348,260 S | 6/1994 | Allgeier |
| 5,343,529 A | 8/1994 | Goldfine et al. |
| 5,396,417 A | 3/1995 | Burks et al. |
| D359,059 S | 6/1995 | Omi |
| D359,483 S | 6/1995 | Saunders et al. |
| D373,354 S | 9/1996 | Maslow |
| D373,576 S | 9/1996 | Liggett |
| D378,587 S | 3/1997 | Kanno et al. |
| D378,916 S | 4/1997 | Kanno et al. |
| 5,619,574 A | 4/1997 | Johnson et al. |
| D381,590 S | 7/1997 | Thoeni et al. |
| D381,651 S | 7/1997 | Banik et al. |
| 5,665,955 A | 9/1997 | Collins, Jr. et al. |
| D386,489 S | 11/1997 | Goldman et al. |
| D387,337 S | 12/1997 | Sween et al. |
| D388,075 S | 12/1997 | Bayer et al. |
| 5,710,886 A | 1/1998 | Christensen et al. |
| 5,719,382 A | 2/1998 | White |
| 5,756,981 A | 5/1998 | Roustaei et al. |
| 5,784,463 A | 7/1998 | Chen et al. |
| 5,797,002 A | 8/1998 | Patterson, Jr. et al. |
| 5,819,226 A | 10/1998 | Gopinathan et al. |
| D400,553 S | 11/1998 | Kung |
| 5,834,751 A | 11/1998 | Jager et al. |
| 5,885,214 A | 3/1999 | Monroe et al. |
| D408,806 S | 4/1999 | Schmidt et al. |
| 5,892,900 A | 4/1999 | Ginter et al. |
| 5,992,747 A | 11/1999 | Katoh et al. |
| D420,657 S | 2/2000 | Keen et al. |
| 6,078,908 A | 6/2000 | Schmitz |
| D430,588 S | 9/2000 | Goldberg et al. |
| 6,178,409 B1 | 1/2001 | Weber et al. |
| 6,216,953 B1 | 4/2001 | Kumagai et al. |
| 6,233,064 B1 | 5/2001 | Griffin |
| D445,417 S | 7/2001 | Lee et al. |
| D447,137 S | 8/2001 | Hultzman |
| D454,879 S | 3/2002 | Lin et al. |
| 6,357,661 B1 | 3/2002 | Schonenberg et al. |
| D464,969 S | 10/2002 | Byun et al. |
| D480,397 S | 10/2003 | Forsythe et al. |
| D483,371 S | 12/2003 | Johnston |
| D486,827 S | 2/2004 | Detallante |
| 6,760,843 B1 | 7/2004 | Carter |
| D493,794 S | 8/2004 | Berentzen et al. |
| D495,335 S | 8/2004 | Masamitsu et al. |
| 6,799,271 B2 | 9/2004 | Kugai |
| 6,834,270 B1 | 12/2004 | Pagani et al. |
| 6,836,485 B1 | 12/2004 | Bendak et al. |
| D504,429 S | 4/2005 | Muto |
| D509,508 S | 9/2005 | Ko et al. |
| D512,065 S | 11/2005 | Ko et al. |
| D512,698 S | 12/2005 | Augenbraun et al. |
| D515,574 S | 2/2006 | Colburn |
| D520,638 S | 5/2006 | Zeindler |
| 7,048,188 B2 | 5/2006 | Kumagai et al. |
| 7,081,979 B2 | 7/2006 | Cotter et al. |
| 7,093,757 B2 | 8/2006 | Boucher et al. |
| D528,444 S | 9/2006 | Horie et al. |
| D542,291 S | 5/2007 | Kang et al. |
| 7,280,981 B2 | 10/2007 | Huang et al. |
| 7,287,009 B1 | 10/2007 | Liebermann |
| 7,287,692 B1 | 10/2007 | Patel et al. |
| D556,068 S | 11/2007 | Fugman et al. |
| D558,811 S | 1/2008 | Higgins et al. |
| D562,834 S | 2/2008 | Bashan et al. |
| 7,328,189 B2 | 2/2008 | Ling |
| 7,330,826 B1 | 2/2008 | Porat et al. |
| RE40,444 E | 7/2008 | Linehan |
| 7,400,932 B2 | 7/2008 | Ackley et al. |
| D574,738 S | 8/2008 | Khurana |
| D574,829 S | 8/2008 | Shirai et al. |
| D578,535 S | 10/2008 | Schmitz |
| 7,437,757 B2 | 10/2008 | Holdsworth |
| 7,442,167 B2 | 10/2008 | Dunki-Jacobs et al. |
| 7,454,356 B2 | 11/2008 | Fields et al. |
| 7,496,527 B2 | 2/2009 | Silverstein et al. |
| 7,533,044 B2 | 5/2009 | Scott |
| 7,555,460 B1 | 6/2009 | Barkan |
| D596,969 S | 7/2009 | Igelmund |
| D597,865 S | 8/2009 | Bernard et al. |
| D598,305 S | 8/2009 | Li et al. |
| 7,596,530 B1 | 9/2009 | Glasberg |
| D602,913 S | 10/2009 | Han et al. |
| 7,606,560 B2 | 10/2009 | Labrou et al. |
| 7,627,967 B1 | 12/2009 | Torvik |
| 7,690,614 B1 | 4/2010 | Mudd et al. |
| D615,887 S | 5/2010 | Alexander et al. |
| 7,730,321 B2 | 6/2010 | Gasparini et al. |
| 7,734,527 B2 | 6/2010 | Uzo |
| 7,753,265 B2 | 7/2010 | Harris |
| 7,822,666 B1 | 10/2010 | Bursch |
| D628,611 S | 12/2010 | Lewis |
| 7,870,077 B2 | 1/2011 | Woo et al. |
| 7,917,444 B1 | 3/2011 | Bursch |
| 7,941,369 B2 | 5/2011 | Juras et al. |
| 7,946,502 B2 | 5/2011 | Faith et al. |
| 7,978,363 B2 | 7/2011 | Takayama |
| D646,187 S | 10/2011 | Edgar |
| 8,041,603 B2 | 10/2011 | Suk |
| 8,052,057 B2 | 11/2011 | Smith et al. |
| D651,530 S | 1/2012 | Baumgartner et al. |
| 8,131,642 B2 | 3/2012 | De Ruiter et al. |
| 8,157,175 B2 | 4/2012 | Kotlarsky et al. |
| 8,186,592 B2 | 5/2012 | Fletcher |
| D662,534 S | 6/2012 | Chang |
| 8,205,797 B2 | 6/2012 | Tredoux et al. |
| 8,255,696 B2 | 8/2012 | Florencio et al. |
| 8,290,876 B1 | 10/2012 | Powell |
| 8,300,799 B2 | 10/2012 | Steul |
| 8,301,494 B2 | 10/2012 | Wills |
| D671,542 S | 11/2012 | Siekmann et al. |
| D671,934 S | 12/2012 | Alman et al. |
| 8,335,745 B2 | 12/2012 | Perlman et al. |
| 8,346,670 B2 | 1/2013 | Hasson et al. |
| 8,359,274 B2 | 1/2013 | Yoder et al. |
| 8,364,544 B2 | 1/2013 | McAlhaney |
| 8,366,005 B2 | 2/2013 | Kotlarsky et al. |
| 8,380,177 B2 | 2/2013 | Laracey |
| 8,381,969 B1 | 2/2013 | Miller et al. |

(56) References Cited

U.S. PATENT DOCUMENTS

| | | |
|---|---|---|
| 8,386,349 B2 | 2/2013 | Dixon et al. |
| 8,423,466 B2 | 4/2013 | Lanc |
| D682,905 S | 5/2013 | Kendall et al. |
| 8,442,894 B2 | 5/2013 | Blackhurst et al. |
| 8,473,354 B2 | 6/2013 | Psota et al. |
| 8,479,992 B2 | 7/2013 | Kotlarsky et al. |
| D689,478 S | 9/2013 | Wikel et al. |
| 8,534,559 B2 | 9/2013 | Drzymala et al. |
| 8,538,821 B2 | 9/2013 | Nguyen et al. |
| 8,559,923 B2 | 10/2013 | Drzyzga et al. |
| 8,571,996 B2 | 10/2013 | Johnson |
| 8,577,803 B2 | 11/2013 | Chatterjee et al. |
| 8,584,251 B2 | 11/2013 | McGuire et al. |
| 8,589,237 B2 | 11/2013 | Fisher |
| 8,595,841 B2 | 11/2013 | Britton et al. |
| 8,620,754 B2 | 12/2013 | Fisher |
| 8,620,790 B2 | 12/2013 | Priebatsch |
| 8,630,620 B2 | 1/2014 | Cha et al. |
| 8,630,851 B1 | 1/2014 | Hertschuh et al. |
| 8,635,157 B2 | 1/2014 | Smith et al. |
| 8,639,619 B1 | 1/2014 | Priebatsch |
| D701,894 S | 4/2014 | Reznik et al. |
| 8,694,438 B1 | 4/2014 | Jernigan et al. |
| D706,145 S | 6/2014 | Pavlak et al. |
| 8,770,478 B2 | 7/2014 | Priebatsch |
| D712,756 S | 9/2014 | Rump et al. |
| 8,838,501 B1 | 9/2014 | Priebatsch |
| 8,924,260 B1 | 12/2014 | Priebatsch |
| D721,371 S | 1/2015 | Rivera et al. |
| 2001/0032884 A1 | 10/2001 | Ring et al. |
| 2002/0069155 A1 | 6/2002 | Nafeh et al. |
| 2002/0095303 A1 | 7/2002 | Asayama et al. |
| 2002/0120587 A1 | 8/2002 | D'Agostino |
| 2002/0131444 A1 | 9/2002 | Moodie et al. |
| 2002/0154342 A1 | 10/2002 | Haining |
| 2002/0193141 A1 | 12/2002 | Wu |
| 2003/0004901 A1 | 1/2003 | Dutta et al. |
| 2003/0059127 A1 | 3/2003 | Khovaylo et al. |
| 2003/0061170 A1 | 3/2003 | Uzo |
| 2003/0061171 A1 | 3/2003 | Gilbert et al. |
| 2003/0074317 A1 | 4/2003 | Hofi |
| 2003/0171993 A1 | 9/2003 | Chappuis |
| 2003/0181168 A1 | 9/2003 | Herrod et al. |
| 2003/0200184 A1 | 10/2003 | Dominguez et al. |
| 2004/0010463 A1 | 1/2004 | Hahn-Carlson et al. |
| 2004/0024707 A1 | 2/2004 | Perre et al. |
| 2004/0039651 A1 | 2/2004 | Grunzig et al. |
| 2004/0073688 A1 | 4/2004 | Sampson |
| 2004/0107170 A1 | 6/2004 | Labrou et al. |
| 2004/0133507 A1 | 7/2004 | Barbour |
| 2004/0230489 A1 | 11/2004 | Goldthwaite et al. |
| 2005/0091068 A1 | 4/2005 | Ramamoorthy et al. |
| 2005/0171900 A1 | 8/2005 | Onneken |
| 2005/0199727 A1 | 9/2005 | Schmidt et al. |
| 2006/0095369 A1 | 5/2006 | Hofi |
| 2006/0116892 A1 | 6/2006 | Grimes et al. |
| 2006/0131390 A1 | 6/2006 | Kim |
| 2006/0151609 A1 | 7/2006 | Schonenberg et al. |
| 2006/0165060 A1 | 7/2006 | Dua |
| 2006/0235796 A1 | 10/2006 | Johnson et al. |
| 2007/0130463 A1 | 6/2007 | Law et al. |
| 2007/0219905 A1 | 9/2007 | Gohmann et al. |
| 2007/0233615 A1 | 10/2007 | Tumminaro |
| 2007/0260544 A1 | 11/2007 | Wankmueller |
| 2007/0299736 A1 | 12/2007 | Perrochon et al. |
| 2008/0033880 A1 | 2/2008 | Fiebiger et al. |
| 2008/0210754 A1 | 9/2008 | Lovett |
| 2008/0212771 A1 | 9/2008 | Hauser |
| 2008/0262925 A1 | 10/2008 | Kim et al. |
| 2008/0281726 A1 | 11/2008 | Gupta |
| 2008/0281733 A1 | 11/2008 | Kubo et al. |
| 2008/0319905 A1 | 12/2008 | Carlson |
| 2009/0024452 A1 | 1/2009 | Martinez et al. |
| 2009/0198617 A1 | 8/2009 | Soghoian et al. |
| 2009/0281948 A1 | 11/2009 | Carlson |
| 2009/0300738 A1 | 12/2009 | Dewe et al. |
| 2010/0070364 A1 | 3/2010 | Dugan |
| 2010/0088236 A1 | 4/2010 | Karabulut et al. |
| 2010/0106569 A1 | 4/2010 | Grimes |
| 2010/0145861 A1 | 6/2010 | Law et al. |
| 2010/0218239 A1 | 8/2010 | Tang et al. |
| 2010/0250290 A1 | 9/2010 | Lefkowitz et al. |
| 2010/0257023 A1 | 10/2010 | Kendall et al. |
| 2010/0262546 A1 | 10/2010 | Sahota et al. |
| 2010/0312649 A1 | 12/2010 | Lurie |
| 2010/0318412 A1 | 12/2010 | Karypis et al. |
| 2010/0325053 A1 | 12/2010 | Hogg et al. |
| 2011/0054981 A1 | 3/2011 | Faith et al. |
| 2011/0078081 A1 | 3/2011 | Pirzadeh et al. |
| 2011/0087595 A1 | 4/2011 | Sabella |
| 2011/0112957 A1 | 5/2011 | Ingram et al. |
| 2011/0112968 A1 | 5/2011 | Florek et al. |
| 2011/0155799 A1 | 6/2011 | Meszaros et al. |
| 2011/0161233 A1 | 6/2011 | Tieken |
| 2011/0191160 A1 | 8/2011 | Blackhurst et al. |
| 2011/0196796 A1 | 8/2011 | Florek et al. |
| 2011/0238476 A1 | 9/2011 | Carr et al. |
| 2011/0246284 A1 | 10/2011 | Chaikin et al. |
| 2011/0251892 A1 | 10/2011 | Laracey |
| 2011/0283042 A1 | 11/2011 | Jeon et al. |
| 2012/0000982 A1 | 1/2012 | Gao et al. |
| 2012/0011019 A1 | 1/2012 | Wakim |
| 2012/0016799 A1 | 1/2012 | Killian et al. |
| 2012/0018516 A1 | 1/2012 | Gao et al. |
| 2012/0028609 A1 | 2/2012 | Hruska |
| 2012/0078789 A1 | 3/2012 | Harrell |
| 2012/0089461 A1 | 4/2012 | Greenspan |
| 2012/0095855 A1 | 4/2012 | Sterling |
| 2012/0116861 A1 | 5/2012 | Dobyns |
| 2012/0123847 A1 | 5/2012 | Wane et al. |
| 2012/0136780 A1 | 5/2012 | El-Awady et al. |
| 2012/0150598 A1 | 6/2012 | Griggs |
| 2012/0150748 A1 | 6/2012 | Law et al. |
| 2012/0158455 A1 | 6/2012 | Pathak et al. |
| 2012/0159647 A1 | 6/2012 | Sanin et al. |
| 2012/0162401 A1 | 6/2012 | Melder et al. |
| 2012/0166264 A1 | 6/2012 | Shum et al. |
| 2012/0169857 A1 | 7/2012 | Sato |
| 2012/0179558 A1 | 7/2012 | Fischer |
| 2012/0187184 A1 | 7/2012 | Challa et al. |
| 2012/0191556 A1 | 7/2012 | Forbes et al. |
| 2012/0197749 A1 | 8/2012 | Gray |
| 2012/0197801 A1 | 8/2012 | Jimenez |
| 2012/0203620 A1 | 8/2012 | Dobyns |
| 2012/0209630 A1 | 8/2012 | Ihm et al. |
| 2012/0226540 A1 | 9/2012 | Batalion et al. |
| 2012/0239577 A1 | 9/2012 | Wolfs et al. |
| 2012/0246015 A1 | 9/2012 | Bennett et al. |
| 2012/0253852 A1 | 10/2012 | Pourfallah et al. |
| 2012/0253903 A1 | 10/2012 | Tavares et al. |
| 2012/0284195 A1 | 11/2012 | McMillen et al. |
| 2012/0290376 A1 | 11/2012 | Dryer et al. |
| 2012/0290389 A1 | 11/2012 | Greenough et al. |
| 2012/0296828 A1 | 11/2012 | Bergdale et al. |
| 2012/0303425 A1 | 11/2012 | Katzin et al. |
| 2012/0310838 A1 | 12/2012 | Harris et al. |
| 2012/0316950 A1 | 12/2012 | LaPorte et al. |
| 2012/0317036 A1 | 12/2012 | Bower et al. |
| 2012/0323657 A1 | 12/2012 | Tiku et al. |
| 2012/0323663 A1 | 12/2012 | Leach |
| 2012/0330744 A1 | 12/2012 | Aissa |
| 2012/0330846 A1 | 12/2012 | Light et al. |
| 2013/0013433 A1 | 1/2013 | Rose et al. |
| 2013/0018715 A1 | 1/2013 | Zhou et al. |
| 2013/0024254 A1 | 1/2013 | Libenson et al. |
| 2013/0043305 A1 | 2/2013 | Zhou et al. |
| 2013/0046603 A1 | 2/2013 | Grigg et al. |
| 2013/0080231 A1 | 3/2013 | Fisher |
| 2013/0080239 A1 | 3/2013 | Okerlund |
| 2013/0103486 A1* | 4/2013 | Hess et al. ............ 705/14.38 |
| 2013/0103512 A1 | 4/2013 | Fisher |
| 2013/0103574 A1 | 4/2013 | Conrad et al. |
| 2013/0110658 A1 | 5/2013 | Lyman et al. |
| 2013/0126605 A1 | 5/2013 | Rooke et al. |

(56) References Cited

U.S. PATENT DOCUMENTS

| | | |
|---|---|---|
| 2013/0134213 A1 | 5/2013 | Pallakoff et al. |
| 2013/0138491 A1 | 5/2013 | Gao et al. |
| 2013/0144792 A1 | 6/2013 | Nilsson et al. |
| 2013/0145173 A1 | 6/2013 | Shablygin et al. |
| 2013/0151402 A1 | 6/2013 | Howard |
| 2013/0158455 A1 | 6/2013 | Ruschmeyer et al. |
| 2013/0159170 A1 | 6/2013 | Gandhi et al. |
| 2013/0173475 A1 | 7/2013 | Lund |
| 2013/0191195 A1 | 7/2013 | Carlson et al. |
| 2013/0191213 A1 | 7/2013 | Beck et al. |
| 2013/0197991 A1 | 8/2013 | Basu et al. |
| 2013/0204690 A1 | 8/2013 | Liebmann |
| 2013/0204894 A1 | 8/2013 | Faith et al. |
| 2013/0212007 A1 | 8/2013 | Mattsson et al. |
| 2013/0218701 A1 | 8/2013 | Challa et al. |
| 2013/0218721 A1 | 8/2013 | Borhan et al. |
| 2013/0246203 A1 | 9/2013 | Laracey |
| 2013/0246266 A1 | 9/2013 | Coleman et al. |
| 2013/0254028 A1 | 9/2013 | Salci |
| 2013/0254052 A1 | 9/2013 | Royyuru et al. |
| 2013/0256403 A1 | 10/2013 | MacKinnon Keith |
| 2013/0262204 A1 | 10/2013 | Stiles et al. |
| 2013/0268381 A1 | 10/2013 | Randazza et al. |
| 2013/0275308 A1 | 10/2013 | Paraskeva et al. |
| 2013/0276023 A1 | 10/2013 | Kent et al. |
| 2013/0282581 A1 | 10/2013 | Singh |
| 2013/0282588 A1 | 10/2013 | Hruska |
| 2013/0311375 A1 | 11/2013 | Priebatsch |
| 2013/0325621 A1 | 12/2013 | Sanginiti et al. |
| 2013/0332251 A1 | 12/2013 | Ioannidis et al. |
| 2013/0334308 A1 | 12/2013 | Priebatsch |
| 2014/0006289 A1 | 1/2014 | Puthenveetil |
| 2014/0019358 A1 | 1/2014 | Priebatsch |
| 2014/0039999 A1 | 2/2014 | Levene et al. |
| 2014/0074571 A1 | 3/2014 | Hope et al. |
| 2014/0074719 A1 | 3/2014 | Gressel et al. |
| 2014/0129450 A1 | 5/2014 | Priebatsch |
| 2014/0263608 A1 | 9/2014 | Rivera et al. |
| 2014/0279554 A1 | 9/2014 | Priebatsch et al. |
| 2014/0279556 A1 | 9/2014 | Priebatsch et al. |
| 2014/0351012 A1 | 11/2014 | Jernigan et al. |
| 2014/0351030 A1 | 11/2014 | Priebatsch |
| 2014/0351126 A1 | 11/2014 | Priebatsch |
| 2015/0019428 A1 | 1/2015 | Priebatsch |

FOREIGN PATENT DOCUMENTS

| | | |
|---|---|---|
| CN | 202221590 U | 5/2012 |
| EP | 1467300 A1 | 10/2004 |
| EP | 1710980 A2 | 10/2006 |
| EP | 2224781 A1 | 9/2010 |
| EP | 2507762 A1 | 10/2012 |
| EP | 2605202 A1 | 6/2013 |
| JP | 2003-187281 A | 7/2003 |
| KR | 10-2010-0097951 A | 9/2010 |
| SG | 194379 A1 | 11/2013 |
| WO | 01/77856 A1 | 10/2001 |
| WO | 03/084175 A1 | 10/2003 |
| WO | 2004/053640 A2 | 6/2004 |
| WO | 2005/017795 A1 | 2/2005 |
| WO | 2005/086593 A2 | 9/2005 |
| WO | 2006/039353 A2 | 4/2006 |
| WO | 2008/069969 A2 | 6/2008 |
| WO | 2008/148118 A2 | 12/2008 |
| WO | 2009/012731 A1 | 1/2009 |
| WO | 2009/131549 A1 | 10/2009 |
| WO | 2009/151832 A2 | 12/2009 |
| WO | 2010/064128 A2 | 6/2010 |
| WO | 2010/133755 A1 | 11/2010 |
| WO | 2010/141239 A1 | 12/2010 |
| WO | 2011/028486 A2 | 3/2011 |
| WO | 2011/056609 A1 | 5/2011 |
| WO | 2011/097250 A1 | 8/2011 |
| WO | 2011/140301 A1 | 11/2011 |
| WO | 2011/146054 A1 | 11/2011 |
| WO | 2012/064964 A1 | 5/2012 |
| WO | 2012/065128 A1 | 5/2012 |
| WO | 2012/078407 A1 | 6/2012 |
| WO | 2012/097171 A2 | 7/2012 |
| WO | 2012/119052 A1 | 9/2012 |
| WO | 2012/125940 A1 | 9/2012 |
| WO | 2012/151590 A2 | 11/2012 |
| WO | 2012/154189 A1 | 11/2012 |
| WO | 2012/158133 A1 | 11/2012 |
| WO | 2013/006725 A2 | 1/2013 |
| WO | 2013/012953 A1 | 1/2013 |
| WO | 2013/049528 A1 | 4/2013 |
| WO | 2013/051031 A1 | 4/2013 |
| WO | 2013/068719 A1 | 5/2013 |
| WO | 2013/071310 A1 | 5/2013 |
| WO | 2013/106679 A1 | 7/2013 |
| WO | 2013/115853 A1 | 8/2013 |
| WO | 2013/117738 A1 | 8/2013 |
| WO | 2013/119914 A1 | 8/2013 |
| WO | 2013/126815 A1 | 8/2013 |
| WO | 2013/126894 A1 | 8/2013 |
| WO | 2013/126996 A1 | 9/2013 |
| WO | 2013/127579 A1 | 9/2013 |
| WO | 2013/138195 A1 | 9/2013 |
| WO | 2013/140196 A1 | 9/2013 |
| WO | 2013/142209 A1 | 9/2013 |
| WO | 2013/144929 A1 | 10/2013 |
| WO | 2013/144930 A1 | 10/2013 |
| WO | 2013/149578 A1 | 10/2013 |
| WO | 2013/151797 A1 | 10/2013 |
| WO | 2013/152247 A1 | 10/2013 |
| WO | 2013/163217 A1 | 10/2013 |
| WO | 2013/170228 A2 | 11/2013 |

OTHER PUBLICATIONS

U.S. Appl. No. 13/718,466, filed Dec. 18, 2012 by Priebatsch et al.; Non-Final Office Action mailed May 20, 2013 and Notice of Allowance mailed Nov. 25, 2013.

U.S. Appl. No. 13/899,760, filed May 22, 2013 by Priebatsch Seth; Non-Final Office Action mailed Oct. 17, 2013; Final Office Action mailed Jan. 29, 2014 and Advisory Action mailed May 19, 2014.

U.S. Appl. No. 13/901,344, filed May 23, 2013 by Jernigan et al.; Non-Final Office Action mailed Dec. 23, 2013; Final Office Action mailed Jun. 6, 2014.

U.S. Appl. No. 13/901,352, filed May 23, 2013 by Priebatsch Seth; Non-Final Office Action mailed Dec. 9, 2013; Final Office Action mailed Mar. 3, 2014 and Advisory Action mailed Jun. 3, 2014.

U.S. Appl. No. 13/925,158, filed Jun. 24, 2013 by Priebatsch Seth; Non-Final Office Action mailed Dec. 6, 2013 and Final Office Action mailed Jun. 26, 2014.

U.S. Appl. No. 13/939,434, filed Jul. 11, 2013 by Priebatsch Seth; Non-Final Office Action mailed Nov. 15, 2013 and Notice of Allowance mailed Mar. 14, 2014.

U.S. Appl. No. 13/939,676, filed Jul. 11, 2013 by Priebatsch Seth; Notice of Allowance mailed Oct. 17, 2013.

U.S. Appl. No. 13/960,260, filed Aug. 6, 2013 by Jernigan et al.; Notice of Allowance mailed Jan. 28, 2014.

U.S. Appl. No. 14/097,737, filed Dec. 5, 2013 by Priebatsch Seth; Non-Final Office Action mailed May 9, 2014.

U.S. Appl. No. 14/107,677, filed Dec. 16, 2013 by Priebatsch Seth; Non-Final Office Action mailed Mar. 4, 2014 and Non-Final Office Action mailed Jul. 9, 2014.

U.S. Appl. No. 14/172,163, filed Feb. 4, 2014 by Priebatsch Seth; Non-Final Office Action mailed Apr. 30, 2014.

U.S. Appl. No. 14/174,116, filed Feb. 6, 2014 by Priebatsch Seth; Non-Final Office Action mailed Apr. 25, 2014.

U.S. Appl. No. 14/189,482, filed Feb. 25, 2014 by Priebatsch Seth; Non-Final Office Action mailed May 8, 2014.

U.S. Appl. No. 14/190,695, filed Feb. 26, 2014 by Priebatsch Seth; Notice of Allowance mailed May 15, 2014.

U.S. Appl. No. 14/227,514, filed Mar. 27, 2014 by Priebatsch, Seth; Non-Final Office Action mailed Jul. 31, 2014.

U.S. Appl. No. 13/797,287, filed Mar. 12, 2013 by Jernigan, Charles Carter Carter et al.

(56) References Cited

OTHER PUBLICATIONS

U.S. Appl. No. 13/864,754, filed Apr. 17, 2013 by Priebatsch, Seth.
U.S. Appl. No. 14/103,101, filed Dec. 11, 2013 by Priebatsch, Seth.
U.S. Appl. No. 29/449,235, filed Mar. 14, 2013 by Steve S. Rivera et al.
U.S. Appl. No. 14/307,066, filed Jun. 17, 2014 by Priebatsch, Seth et al.
U.S. Appl. No. 14/460,628, filed Aug. 15, 2014 by Priebatsch, Seth.

* cited by examiner

PAYMENT PROCESSING WITH AUTOMATIC NO-TOUCH MODE SELECTION

CROSS-REFERENCE TO RELATED APPLICATION

This application is a continuation of and claims priority to U.S. patent application Ser. No. 13/939,434, filed on Jul. 11, 2013, the disclosure of which is hereby incorporated by reference in its entirety.

TECHNICAL FIELD

The present invention relates, in general, to payments made with mobile devices, and, in particular, to payment processing without the need for user selection of a payment authentication modality.

BACKGROUND

It is common practice for consumers to conduct electronic transactions with merchants for goods or services received. Electronic payments are typically made with a token that identifies a source of funding. For example, a credit card containing a magnetic strip is a token. The payment tokens usually contain static information, such as an account number, identifying a source of payment. When a credit card is swiped, the card number is transmitted to a centralized payment-processing system. A physical token such as a credit card cannot be easily modified and, in the event that it is lost or stolen, the consumer must report the lost card and wait for a replacement to be mailed. As a result, systems that allow a consumer to pay for a transaction at the point of sale (POS), using a mobile device to display a token (usually in the form of a barcode or QR code), are becoming widely accepted. In fact, due the ease the ease of generating and replacing these tokens, mobile tokens for a wide variety of transaction types (payment tokens, ticket tokens, promotional offer tokens, etc.) are being developed. However, just as a consumer may take a few minutes to locate the appropriate credit card in his wallet, he may struggle to locate the appropriate application on his mobile device to display the token. Launching the application, once found, is another step the consumer must typically take before the token is displayed.

Accordingly, there is a need for a mobile transaction system that improves the ease and efficiency of the consumer's experience in completing a payment transaction.

SUMMARY

In various embodiments, the present invention provides a "no-touch" mobile checkout experience that frees consumers from the need to manually locate and activate a mobile payment application in order to complete a transaction. The consumer simply brings his mobile device within close range of an interface console, which in various embodiments prompts the device to launch an application that causes display of a payment token without user action. If the consumer's device is not NFC-capable, the interface console can read a displayed token optically in the usual fashion.

Accordingly, in one aspect, the invention pertains to a method of processing a transaction between a consumer and a merchant. In representative embodiments, the method includes receiving, from a remote token-generating server, a token by a device of the consumer and storing the token in a memory of the device; positioning, by the consumer, a display of the device within view of an optical scanner of a merchant checkout system capable of NFC communications; if the device is NFC enabled and within NFC range of the checkout system, establishing, without action by the consumer, an NFC communication channel between the device and the checkout system, communicating, by the checkout system, over the communication channel a request to display the stored token, in response to the request, displaying, by the device, the stored token, optically reading and electronically decoding, by the checkout system, the token upon presentation thereof by the device, and completing, by the checkout system, the transaction based at least in part on the decoded token information; and if the device is incapable of NFC communications, in response to an action by the consumer, displaying, by the device, the stored token, optically reading and electronically decoding, by the checkout system, the token upon presentation thereof by the device, and completing, by the checkout system, the transaction based at least in part on the decoded token information.

The request may specify a type of stored token to display. In various embodiments, the checkout system receives a decryption key from the token-generation server. The device may receive and store a plurality of tokens. The device may be NFC-enabled and may poll its environment, by regularly transmitting an NFC signal, for NFC circuitry within NFC range.

In another aspect, the invention relates to a checkout system. In various embodiments, the checkout system includes NFC circuitry for establishing a communication channel with an NFC-enabled device within an NFC range and communicating over the communication channel a request to display a token; an optical scanner for reading an optically displayed token within a field of view of the scanner; reading circuitry, responsive to the optical scanner, for electronically decoding the token; and a processor for completing the transaction based at least in part on the decoded token. The NFC circuitry may be contained in an NFC tag and/or may be configured to be powered by an external NFC signal.

In another aspect, the invention relates to a wireless device. In various embodiments the wireless device includes a processor; a memory; a display; telecommunication circuitry for establishing, via the public telephone network, a channel for secure data exchange with a remote token-generating server; NFC circuitry for establishing NFC communications with an NFC-capable merchant checkout system; and a control application, executable by the processor and configured for causing storage, in the memory, of a token received from the token-generating server by the telecommunication circuitry, causing display of an action button on the display, causing the NFC circuitry to monitor for availability of NFC, where NFC availability is detected by the NFC circuitry, autonomously establishing an NFC communication channel, detecting an external request received via the NFC channel to display the stored token, and in response, causing the stored token to appear on the display without user action, and where NFC availability is not detected by the NFC circuitry, causing the stored token to appear on the display only upon user selection of the displayed button.

In various embodiments, the control application is configured for receiving a plurality of tokens and causing storage thereof in the memory. Additionally, the control application may be configured to detect a request to display a particular type of token from the plurality of tokens and to responsively cause a token of the requested type to appear on the display.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. In addition, the terms like "consumer equipment," "mobile station," "mobile," "communication device," "access terminal," "terminal," "handset," and similar terminology, refer to a wireless device (e.g., cellular phone, smart phone, computer, PDA, set-top box, Internet Protocol Television (IPTV), electronic gaming device, printer, and so forth) utilized by a consumer of a wireless communication service to receive or convey data, control, voice, video, sound, gaming, or substantially any data-stream or signaling-stream. The foregoing terms are utilized interchangeably in the subject specification and related drawings. The terms "component," "system," "platform," "module," and the like refer broadly to a computer-related entity or an entity related to an operational machine with one or more specific functionalities. Such entities can be hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Figure 1:
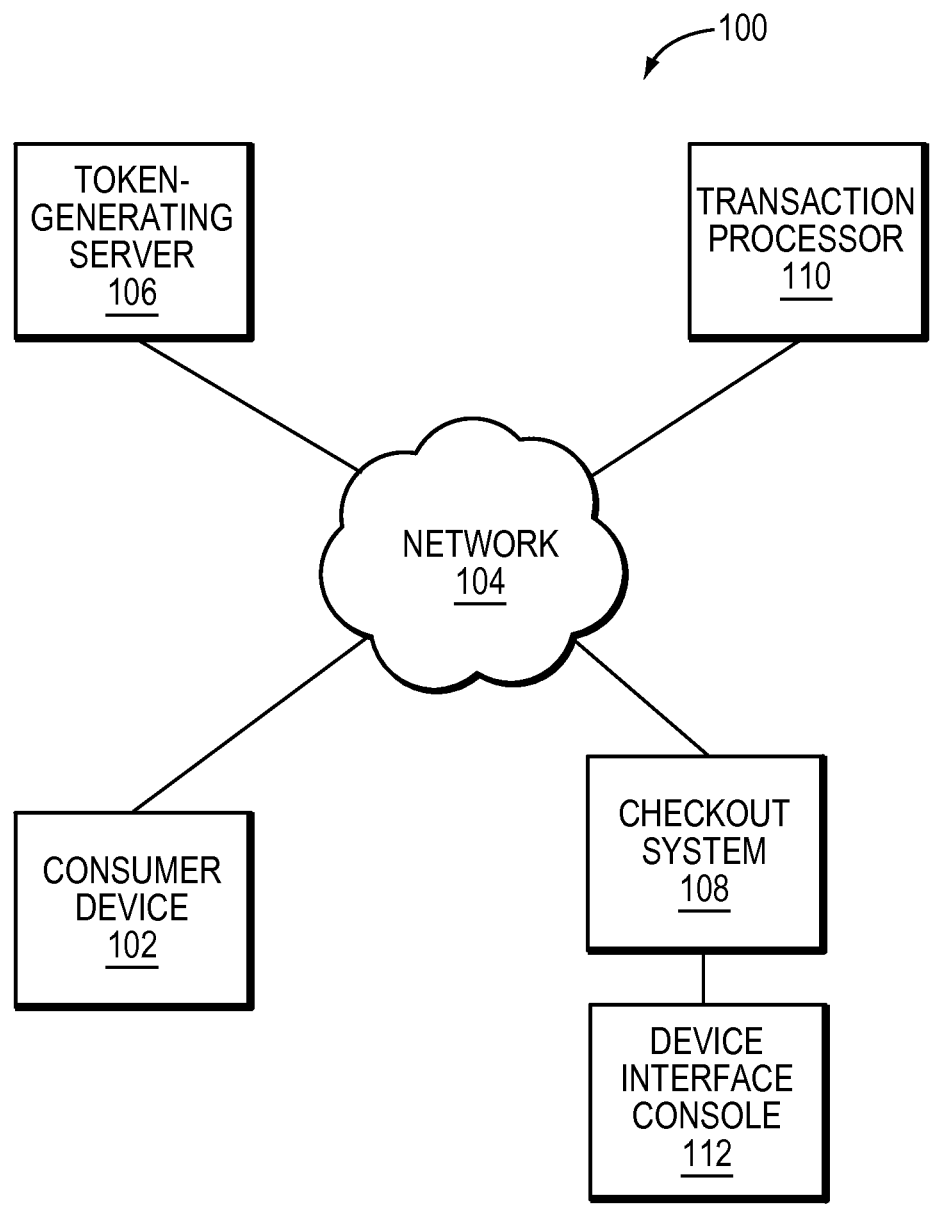
FIG. 1 is a block diagram of an exemplary network in accordance with an embodiment of the invention.

Refer first to FIG. 1, which depicts an exemplary no-touch mobile transaction network 100 including a consumer device (e.g., a mobile device) 102 linked to a network 104 (e.g., a cellular telephone network, the Internet, or any wide-area network or combination of networks capable of supporting point-to-point data transfer and communication) that supports wired, wireless, or any two-way communication. The network 104 connects various devices, including a token-generating server 106, one or more checkout systems 108, and a transaction processor 110 utilizing, again, wired, wireless, or any two-way communications. The token-generating server 106 is responsible for generating unique tokens associated with the consumer; the tokens contain, for example, consumer-identifying information, financial information, coupon information, and/or ticketing information. In response to requests made by a registered user via the consumer device 102, the server 106 generates tokens and transmits them to the consumer device 102 for storage for subsequent presentation to complete a transaction with the checkout system 108. Additionally, in various embodiments, the token-generating server 106 may encrypt the tokens prior to transmission and provide the checkout system 108 and/or the transaction processors 110 with a decryption key.

Each checkout system 108 may be associated with a merchant who offers goods or services for sale to, among others, the consumer possessing the mobile device 102 and who wishes to offer a no-touch checkout experience to the consumer. The checkout system 108 may be a POS system (e.g., an electronic cash register, a ticketing kiosk, etc.) that connects to a device interface console 112. The device interface console 112 is responsible for establishing an NFC channel with an NFC-enabled device 102 within NFC range (e.g., within approximately 20 cm) to request the display of a token, reading and decoding a token, and making the decoded information available to the checkout system 108. In addition, the console 112 may be mobile or physically associated with the checkout system 108. The checkout system 108 may be responsible for completing the transaction based on information provided therein and/or for decrypting any encrypted token information. Alternatively, the checkout system 108 may transmit the token information to the transaction processor 110 to request authorization for the transaction. The transaction processor 110 may be responsible for authorizing the transaction, and, in some cases, for decrypting the token. In one embodiment, the transaction processor 110 is a payment processor responsible for or actually performing the transaction based on financial information included in, or linked to, the token. For example, a so-called "direct" payment processor represents the financial-processing backend provider to credit-card issuers and payment services such as PAYPAL. An "indirect" payment processor is an independent entity processing transactions for multiple payment services and maintains its own records and data. The distribution of responsibility for various aspects of transaction processing among the checkout system 108 and other entities represents a design choice.

Figure 2A:
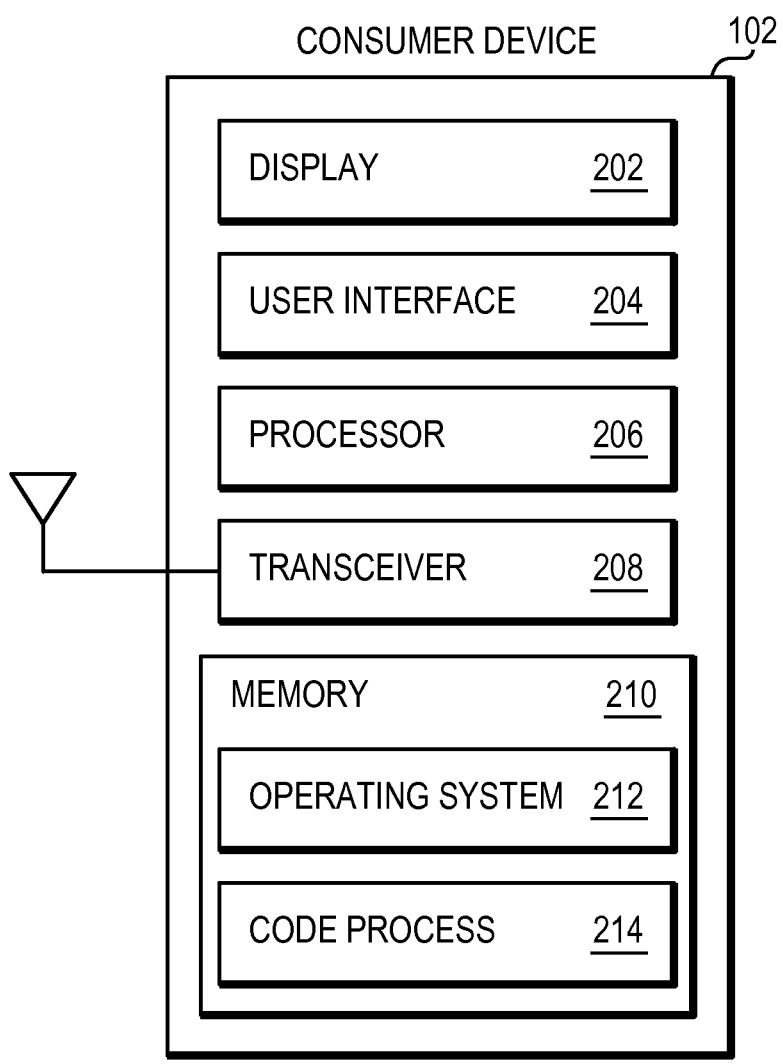
FIGS. 2A and 2B are block diagrams of an exemplary consumer device and checkout system, respectively, in accordance with an embodiment of the invention.

The mobile device 102 acts as a gateway for transmitting the consumer's data to the network 104. The mobile device 102 can support multiple communication channels for exchanging multimedia and other data with the token-generating server 106, the console 112, and other devices using a Wi-Fi LAN (e.g., IEEE 802.11 standard) for Internet access, a short-range Bluetooth wireless connection for point-to-point access, and/or an NFC channel (e.g., IEEE 802.2 standard) for close-proximity access. Referring to FIG. 2A, in various embodiments, a representative mobile device 102 includes a conventional display screen 202, executable instructions encoding a user interface 204, a processor 206, a transceiver 208, and a memory 210. The transceiver 208 may be a conventional component (e.g., a network interface or transceiver) designed to provide communications with a network, such as the Internet and/or any other land-based or wireless network or system, and, through the network, with the token-generating server 106 and the console 112. In various embodiments, the mobile device 102 includes NFC circuitry and an NFC antenna (not illustrated in FIG. 2A) for communicating wirelessly at 13.56 MHz (e.g., according to the ISO/IEC 18092 standard) with other NFC devices, such as checkout system 108, within NFC range. When NFC capabilities are enabled, the device 102 typically operates a background process that continuously polls its environment for NFC devices or tags within NFC range and autonomously establishes an NFC channel with any such device.

The memory 210 includes an operating system (OS) 212, such as GOOGLE ANDROID, NOKIA SYMBIAN, BLACKBERRY RIM or MICROSOFT WINDOWS MOBILE, and a code process 214 that implements the device-side functions as further described below. Additional transactional information may be embedded in the code process 214 for transmission through the network 104 for later processing on a back-end server (e.g., the token-generating server 106). As used herein, the term "mobile device" refers to a "smart phone" or tablet with advanced computing ability that, generally, facilitates bi-directional communication and data transfer using a mobile telecommunication network, and is capable of executing locally stored applications and/or payment transactions. Mobile devices include, for example, IPHONES (available from Apple Inc., Cupertino, Calif.), BLACKBERRY devices (available from Research in Motion, Waterloo, Ontario, Canada), or any smart phones equipped with the ANDROID platform (available from Google Inc., Mountain View, Calif.), tablets, such as the IPAD and KINDLE FIRE, and personal digital assistants (PDAs). The memory 210 may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit.

In operation, with reference to FIGS. 1 and 2A, a user downloads and operates an executable, interactive application (an "app") onto his mobile device 102, creating, on first use, an account with to the token-generating server 106—e.g., supplying identifying information and creating a username/password pair or other strong form of authentication for logging in to the server 106 to retrieve a token. The app may include code that renders it self-launching upon NFC data exchange with an interface console 112; in this way, once the app is downloaded, the user may execute it simply by bringing his NFC-enabled device 102 within NFC range of the device interface console 112 as described in greater detail below. Alternatively, the user may launch the app by selecting, for example, a button or icon displayed on device 102. When launched on the mobile device 102, the app causes display of a token by retrieving, from the memory 210, a stored token previously downloaded from token-generation server 106; alternatively, the app may cause the mobile device 102 to communicate with the token-generating server 106, providing the username/password identifying information to request a token. In the latter case, when a token is requested, the identifying information is verified, and the token-generating server 106 looks up the consumer's account data and generates a token for the consumer.

The token contains data that identifies the consumer and/or the token, and may contain actual financial account information, coupon information, and/or ticketing information or may instead contain information (such as an email address, telephone number, or random unique data) that can be mapped to the consumer's account by the transaction processor 110. In one embodiment, before being sent, the token is encrypted using, for example, a private key. The encrypted token is then transmitted to the mobile device 102. The token-generation process may take place at any time after a consumer registers an account and the token may be delivered to the mobile device 102 at any time a network connection can be established. Accordingly, generation of the token and delivery of the token may occur as two separate steps and may not happen at the same time. In one embodiment, the mobile device 102 stores a stack of tokens that may be rotated periodically or upon a triggering event, such as display. Additionally, the app may receive and store multiple tokens for various types of transactions and in response to a request for a specific type of token retrieve the appropriate token from storage in device 102.

Figure 2B:
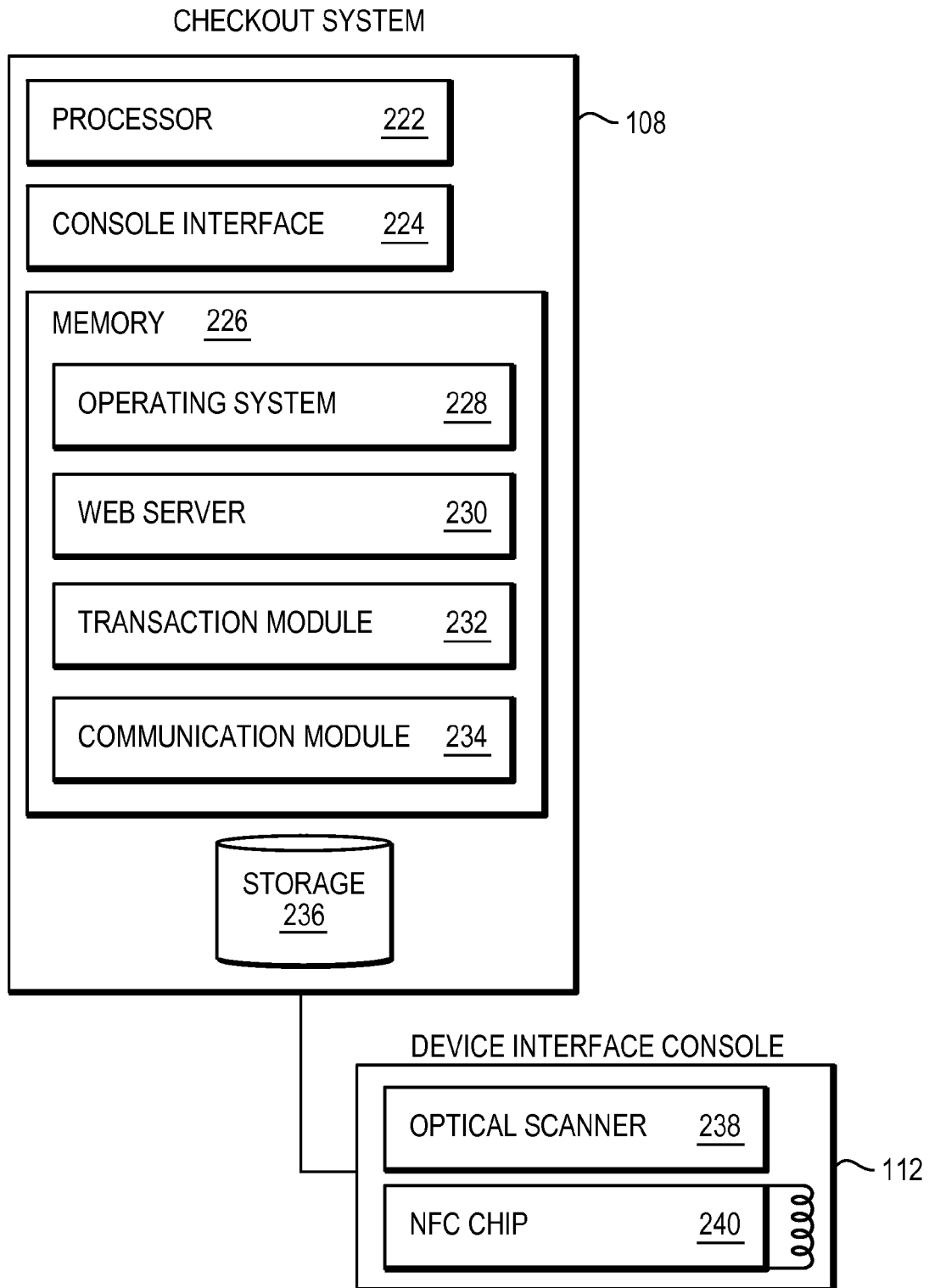

The checkout system 108 may be configured to offer the consumer possessing mobile device 102 a no-touch checkout experience. Referring to FIG. 2B, in various embodiments, the checkout system 108 includes a processor 222, a console interface 224, and a memory 226, which may include volatile and non-volatile portions. The memory 226 contains instructions, conceptually illustrated as a group of modules, that control the operation of the processor 222 and its interaction with hardware components. An operating system 228 directs the execution of low-level, basic system functions such as memory allocation, file management, and operation of mass storage devices. At a higher level, a web server block 230, a transaction module 232, and a communication module 234 perform the basic system functions described in greater detail below. The communication module 234 may be a conventional component (e.g., a network interface or transceiver) designed to provide communications with a network, such as the Internet and/or any other land-based or wireless telecommunications network or system, and, through the network, with the transaction processor 110 and, in some embodiments, the console 112 and the token-generating sever 106. The web-server block 230 enables web-based communication and can be a conventional web-server application executed by the processor 222. The transaction module 232 is responsible for evaluating the decoded data contained within a token obtained via the console interface 224 from the console 112 and processing the transaction according to the information contained therein. The transaction module 232 may be configured to process transactions to best suit the merchant's checkout needs. For example, the transaction module 232 may be configured to accept payment tokens and determine whether to accept payment based on the information contained therein. The transaction module 232 may save transactional information in a storage device 236 for immediate or later transmission through the network 104 for processing on a back-end server (e.g., the transaction processor 110). Additionally, the transaction module 232 may store one or more decryption keys obtained from the token-generating server 106 and, using one of the keys, may decrypt the token obtained via the console interface 224. Alternatively, the transaction module 232 may send the token and transactional information to the transaction processor 110 for verification of token validity and/or the consumer's ability to pay before processing the transaction.

The checkout system 108 is physically or remotely connected to, or includes, the device interface console 112, which is capable of communicating over an NFC channel with a mobile device 102 within NFC range. For example, in response to the polling signal, the communication module 234 may send a message to the device 102 that causes it to display a token in connection with the transaction; for example, the message may "wake up" an app running in the background on the device 102. Once the token is displayed, the console 112 may read the token using any suitable modality, providing a no-touch checkout experience for the consumer. Thus, the term "display" broadly connotes presentation, e.g., as an optically readable pattern on the display 202 of the device 102 or as data communicated by NFC. The console 112 contains an optical scanner 238 and an NFC communication chip 240, enabling it to read data optically or via NFC, and may contain further communication capabilities if interaction over other communication modalities is desired.

The scanner 238 may be any form of optical scanner capable of reading and decoding an optically displayed token, such as a barcode or QR code. In various embodiments, the scanner 238 is configured to continuously, or periodically, scan its environment to detect an optical token within its field of view. Alternatively, or in addition, the checkout system 108 may signal the scanner 238, via the console interface 224, that a barcode is expected when a mobile device has been detected within NFC range. The NFC communication chip 240 contains NFC circuitry, an NFC antenna (e.g., a loop-inductor-antenna), and a memory for storing data. The NFC chip 240 is capable of operating the console 112 to communicate wirelessly, for example, at 13.56 MHz with other NFC devices within NFC range to transmit and receive data. A message communicated by the NFC chip 240 may contain a request to open, or a URL for, the client app downloaded on mobile device 102; when read, the message triggers the app to open and display a token. Additionally, in some embodiments, that message also contains a request for a specific type of token (e.g., a payment token). In various embodiments, this message is modifiable and/or customizable to the merchant's type of business or checkout needs. The NFC communication chip 240 may draw power from the console 112 or checkout system 108 and be capable of operating in both passive and active modes; in various embodiments, the operating mode may be selected manually by an operator of the checkout system 108. When operating in active mode the NFC communication chip 240 may poll its environment to detect other NFC devices within range and establish an NFC communication channel with the detected device. Alternatively, the chip 240 may be an NFC tag (i.e., ISO 14443 or FeLiCa compliant) that functions without any battery or power source of its own. Instead, when the consumer brings his NFC-enabled mobile device 102 within NFC range of the tag by "tapping" his device to the console 112, the NFC tag 240 becomes powered by the mobile device's signal and, for example, may modulate the polling signal to send data to the mobile device. In this embodiment, it is possible to convert any optical scanner 238 to operate in accordance herewith merely by affixing such a tag (e.g., in the form of a sticker) to the scanner.

Figure 3A:
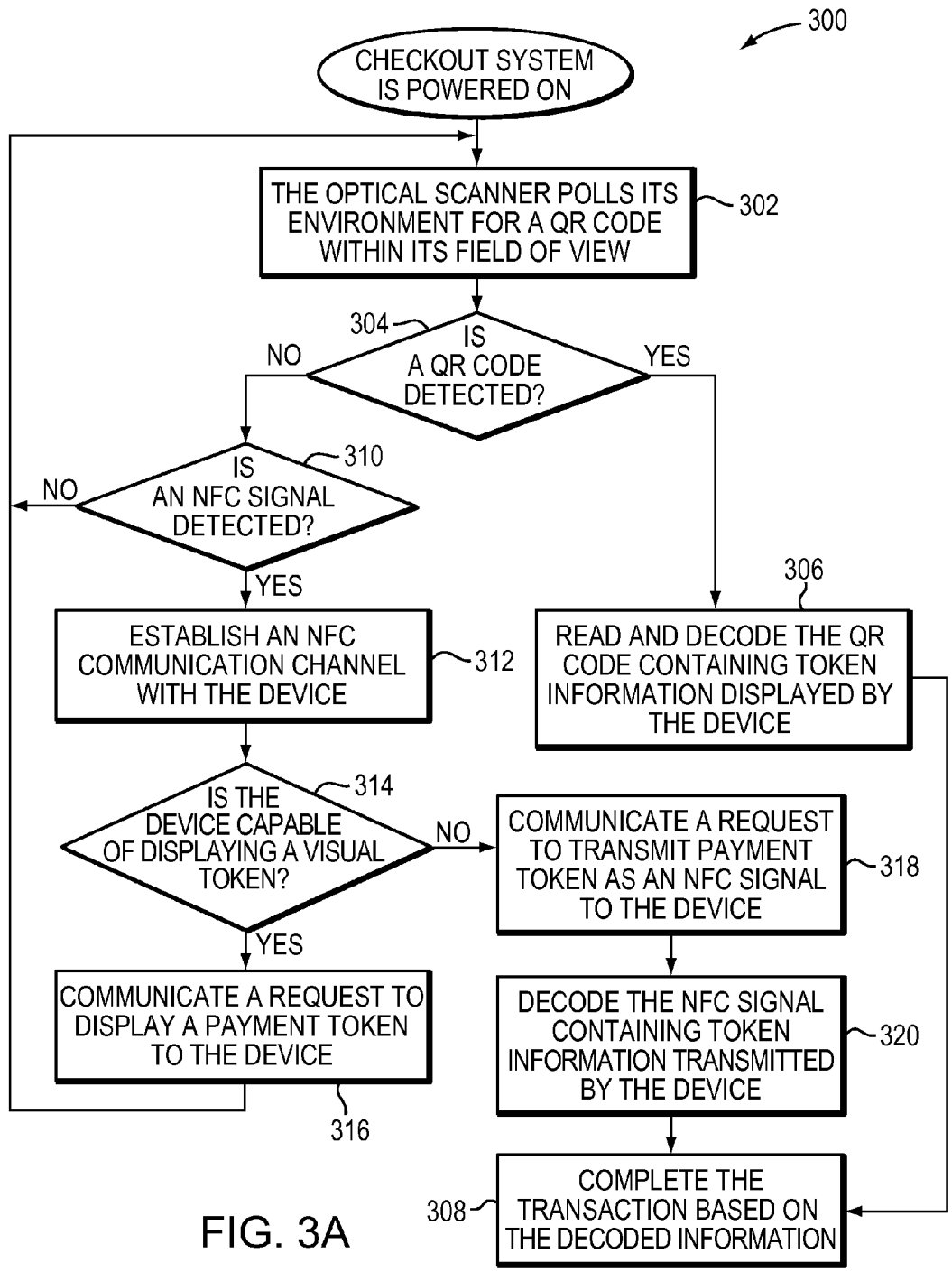
FIGS. 3A and 3B depict exemplary methods of operating the checkout system in accordance with embodiments of the invention.

With reference to FIG. 3A as well as FIGS. 1, 2A, and 2B, a flowchart 300 depicts a set of exemplary operations of the checkout system 108 in accordance with an embodiment of the invention. The sequence 300 enables the checkout system 108 to facilitate a no-touch mobile transaction experience for the consumer with an NFC-enabled device 102. Additionally, the system 108 is capable of conventionally processing a transaction, albeit without offering a one-touch experience for the consumer, with a mobile device 102 able to display the token in visual form but which is not NFC-enabled. (The mobile device 102 may either not have NFC capabilities or the consumer may have chosen to disable NFC to, for example, conserve power.) Additionally, it should be noted that the consumer has the option at any time (even on an NFC-enabled device) of manually opening the client app downloaded to her device 102 to display a stored token. The optical scanner 238 of the console 112 may be in a continuous ready mode, reading an optically displayed token as soon as it is brought within reading range (step 302). Accordingly, in the event that the consumer elects, for any reason, to display the token by manually selecting a button on her mobile device 102 to execute the app, the QR code will be detected by the optical scanner 238 when she places the device 102 with the display 202 (already displaying the QR code) in view of the scanner. Upon detection (step 304), the optical scanner reads and decodes the QR code (step 306) making the decoded information available, via the console interface 224, to the checkout system 108 to complete the transaction based on the information (step 308).

If the mobile device 102 is NFC-enabled, the consumer may choose to execute the client app and present a token simply by tapping her device 102 to the console 112. Once an NFC-enabled device 102 is detected by the checkout system 108, a high-frequency magnetic field is created between the loosely coupled coils of the NFC antennas in the mobile device 102 and the console 112 (step 310). Once this field is established, a connection is formed and information can be passed between the device 102 and the console 112 (step 312). Where both the console 112 and mobile device 102 are operating in active NFC modes, a handshake may take place in which the roles are assigned, or the devices may take turns operating as interrogator and target in the half-duplex standard of NFC communication. The system 108 may query, via the NFC chip 240, the device 102 to determine whether the device is capable of displaying a token in visual form (step 314), and if so, signaling a request to execute the client app that will display a token without any action from the consumer (step 316). The optical scanner 238, operating responsively or independently of the NFC chip 240, detects the token displayed by the device 102 (step 304). For example, the checkout system 108 may receive notification from the console 112 that an NFC device has been detected in range, and that the device possesses adequate graphical capability to display a token; the system 108, in turn, signals the optical scanner 238 that token presentation is imminent. In response, the scanner 238 may "wake up" to detect the token immediately upon its presentation. The optical scanner 238 reads and decodes the token information (step 306) and transmits the data through the console interface 224 to the checkout system 108. If, however, the system 108 determines that the device 102 cannot display the token visually, the console 112, via the NFC chip 240, may request the token information from the device 102 as an NFC signal (step 318). The console 112 then electronically decodes the token upon receipt thereof (step 320) and transmits the data through the console interface 224 to the checkout system 108. In one embodiment, a secure NFC communication channel may be first established and all token information sent in encrypted form.

The transaction module 232 then determines how to process the transaction based on the information received from the console 112 (step 308). For example, the transaction module 232 may decide whether to accept the consumer's payment based on the decoded token information, saving the transactional information in the storage device 268 for later transmission through the network 104 for processing on a back-end server (e.g., the transaction processor 110). Alternatively, the transaction module 232 may send the token to the transaction processor 110 for verification of the validity and/or the consumer's ability to pay before processing the transaction. Additionally, the transaction module 232 may store one or more decryption keys obtained from the token-generating server 106 and use one of these to decrypt the token prior to evaluating the information contained therein. The transaction module 232 may authorize a transaction based on any successfully decrypted token, or may instead additionally evaluate the decrypted token information.

Given the widespread adoption among consumers of wireless devices (e.g., smartphones or tablets) with advanced graphical displays, the merchant may deem it unnecessary to have a checkout system 108 capable of receiving a token via NFC. In such cases, the NFC chip 240 in console 112 may be a simple NFC tag that functions without any battery or power source of its own. As described above, when the consumer brings his NFC-enabled mobile device 102 within NFC range of the tag by "tapping" his device to the console 112, the NFC tag 240 becomes powered by the mobile device's signal. Alternatively, the checkout system 108 may have a conventional NFC chip 240 set to operate in a passive mode.

Figure 3B:
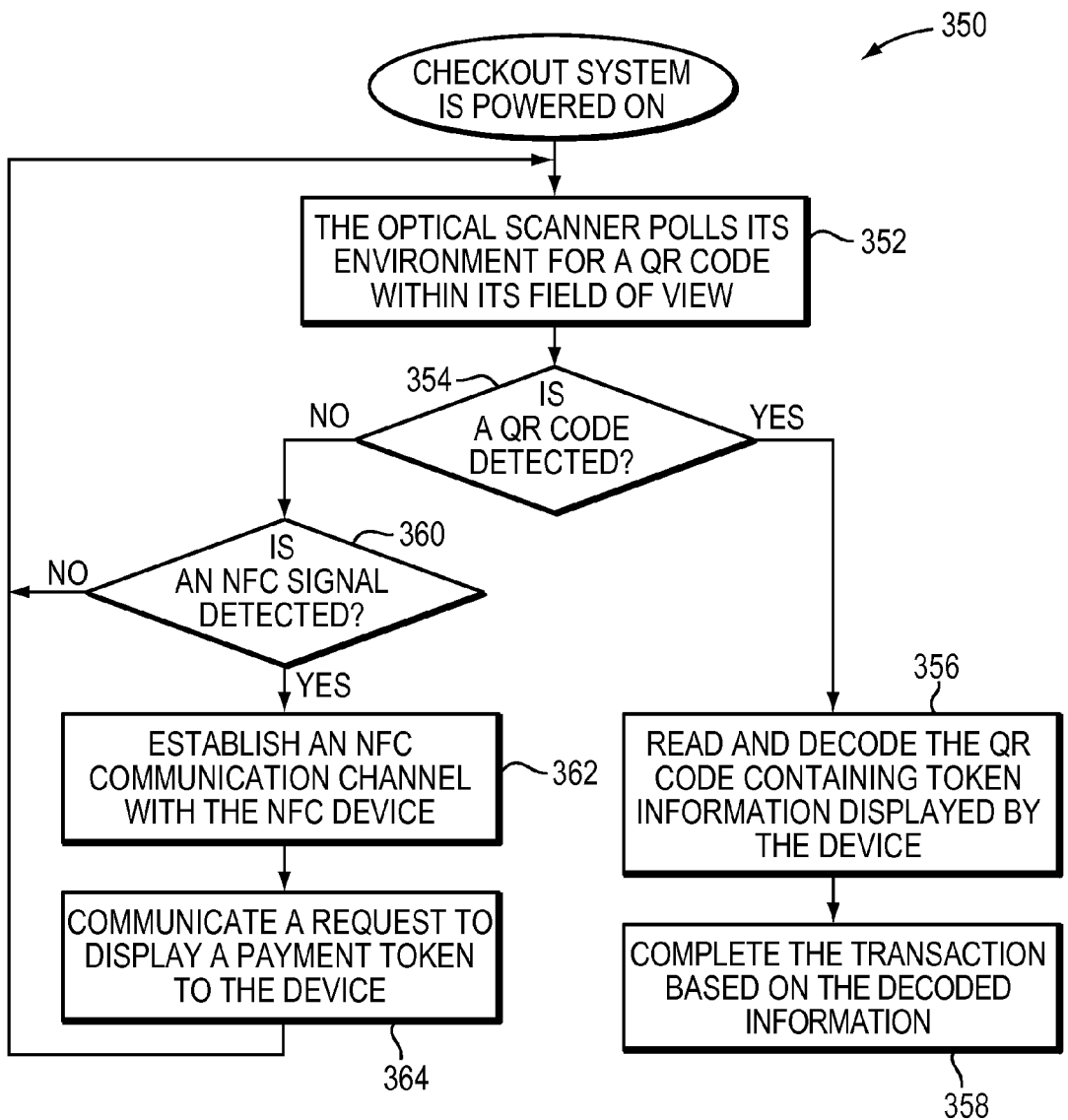

FIG. 3B illustrates this simplified mode of operation. As described previously, the optical scanner 238 may be operated so as to be continuously ready to read an optically displayed token in the form of, for example, a QR code (step 352). In the event that the consumer elects to display the token by manually selecting a button on her mobile device 102 to execute the app, the QR code will be detected by the optical scanner 238 when the consumer places the display 202 of the device 102 in view of the scanner (step 354). Upon detection of the token, the optical scanner reads and decodes it (step 356), making the decoded information available, via the console interface 224, to the checkout system 108 to complete the transaction based on the information (step 358).

If the mobile device 102 is NFC-enabled, the consumer may choose to execute the client app and display a token simply by tapping her device 102 to the console 112. When the consumer brings his NFC-enabled mobile device 102 within NFC range of the NFC tag 240 by tapping his device to the console 112, the tag 240 becomes powered by the mobile device's signal (step 360). NFC information can be passed between the device 102 and the console 112 (step 362). The mobile device 102, operating in an active NFC mode, acts as the interrogator; the tag may respond simply by modulating the reading signal, or may draw power from the signal to operate in an active mode that facilitates data exchange. The mobile device 102 may send, for example, an interrogation message to the NFC tag 240 to find out what type of communication it uses, such as Type A/B or FeLiCa. When the NFC tag 240 responds, the interrogating mobile device 102 sends its first commands in the appropriate fashion. The commands may be transmitted, for example, using phase jitter modulation (PJM) to modify the surrounding field and send out a signal, or using any suitable modality known to those in the art. The NFC tag 240 receives the instruction and checks if it is valid. If it is a valid request, the tag 240 responds with a message that, when read by the device 102, triggers the app to open and ultimately display a visual token without any action from the consumer (step 364). The optical scanner 238 detects the token that is now on display within its field of view. The optical scanner 238 reads and decodes the token information (step 356) and transmits the data through the console interface 224 to the checkout system 108. As previously described, the transaction module 232 then determines whether to authorize the transaction immediately or undertake further processing (step 358).

Figure 4:
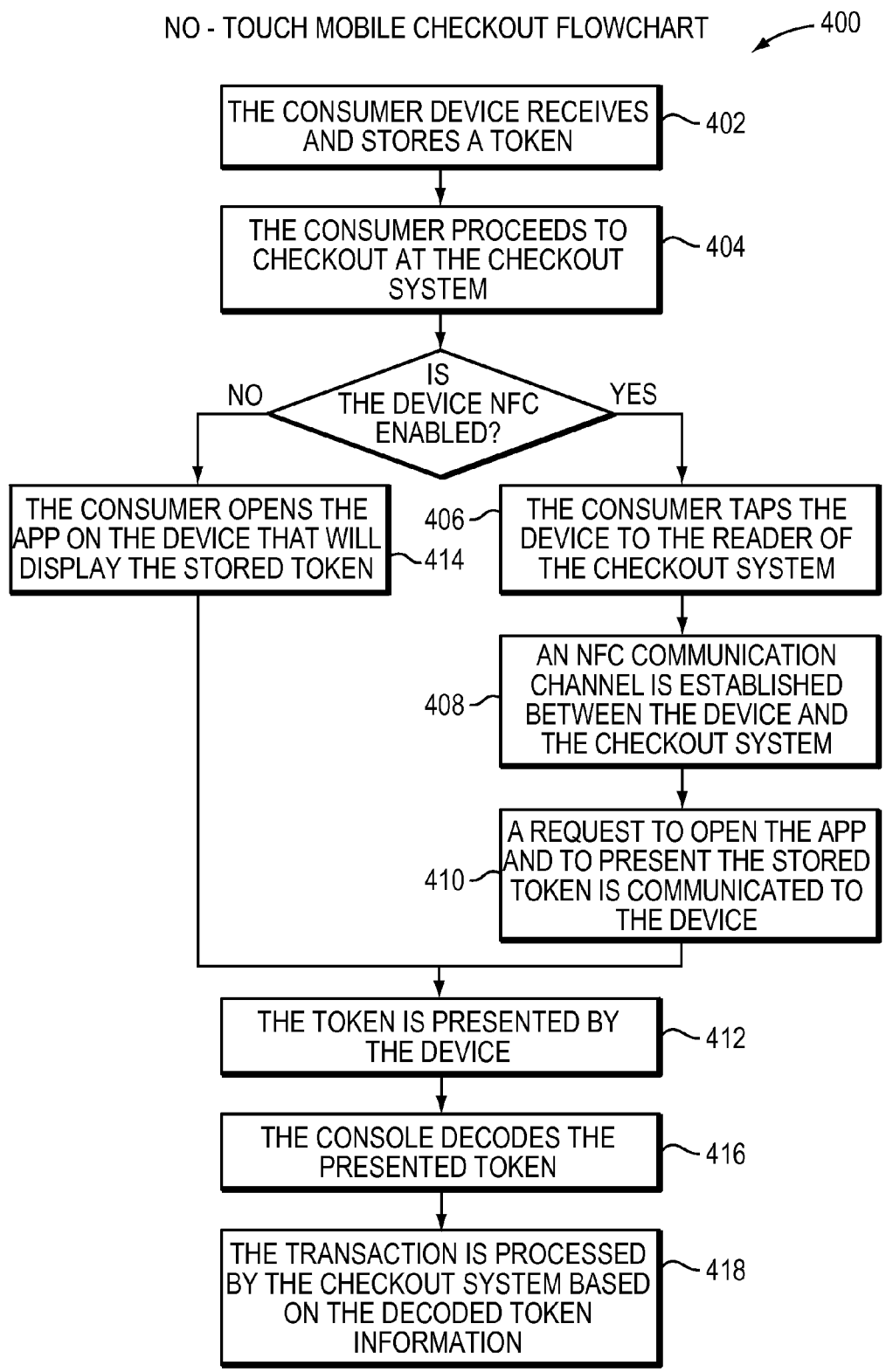
FIG. 4 is a flowchart illustrating operation of a mobile device interacting with a checkout system as depicted in FIGS. 3A and 3B.

FIG. 4 illustrates the operations undertaken by the mobile device 102. As described above, one or more tokens are received and stored by the mobile device 102 via the client app associated with token-generating server 106 (step 402). The consumer proceeds to the checkout system 108 to complete a transaction (step 404). The transaction may be payment for goods or services or, for example, the token may be a ticket (e.g., an airline ticket) for an event or service. If the consumer's device 102 is NFC enabled, he may simply bring it within NFC range of the console 112 (step 406), position it with the display 202 in view of the optical scanner 238 if visual token display is available on his device, and await completion of the transaction. When the two devices are in NFC range, NFC communication is established and information is passed between the device 102 and the console 112 without any further action by the consumer (step 408). The mobile device may assume the role of interrogator. requesting information from the NFC chip (or tag) 240. The NFC chip 240 responds with a message that contains a request, or a URL, that when read by the mobile device 102 triggers the device to execute the downloaded app (step 410). In one embodiment, the message contains a request specifying the type of token that should be displayed for the particular checkout system 108 and/or the type of transaction. Alternatively, the consumer may have different applications stored on her device 102 for various transaction types (e.g., payment, discount, ticketing, etc.,) and the NFC message contains an instruction to open the appropriate app. For example, the console 112 may be associated with an airline and used to collect mobile tickets at a security checkpoint or a boarding gate. In this example, the NFC message embedded in the NFC chip 240 requests the presentation of a token containing airline ticketing information, and the app responsively presents (visually or as an NFC signal) the appropriate token stored in the memory 210 of the mobile device 102 without requiring action from the consumer (step 412). Alternatively, if the mobile device 102 is not NFC-enabled at the time of checkout, the consumer executes the app by selecting an icon displayed on device 102 (step 414). Upon detection of a visually displayed token in the form of, for example, a QR code, the optical scanner 238 reads and decodes the QR code and makes the decoded information available to the checkout system 108 (step 416), processing the data to complete the transaction (step 418).

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. For example, each of the processors described herein may be a general-purpose computer, but alternatively may be a CSIC (consumer-specific integrated circuit), ASIC (application-specific integrated circuit), a logic circuit, a digital signal processor, a programmable logic device, such as an FPGA (field-programmable gate array), PLD (programmable logic device), PLA (programmable logic array), RFID processor, smart chip, or any other device or arrangement of devices that is capable of implementing the steps of the processes of the invention.

Various implementations of the systems and techniques described here can be realized in digital electronic circuitry, integrated circuitry, specially designed ASICs (application specific integrated circuits), computer hardware, firmware, software, and/or combinations thereof These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The various modules and apps described herein can include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of processing a transaction between a consumer and a merchant, the method comprising:
   receiving, from a remote token-generating server, a token by a consumer device capable of communication over a short-range wireless connection, and storing the token in a memory of the device;
   positioning, by the consumer, a display of the device within view of an optical scanner of a merchant checkout system capable of communication over a short-range wireless connection;
   when the device is within range of the checkout system, (i) establishing, without action by the consumer, a communication channel between the device and the checkout system over a short-range wireless connection, (ii) communicating, by the checkout system over the communication channel a request to display the stored token, (iii) in response to the request, displaying, by the device, the stored token, (iv) optically reading by the checkout system, the token upon presentation thereof by the device, and (v) causing completion, by the checkout system, of the transaction.

2. The method of claim 1, wherein the method includes the step of electronically decoding, by the checkout system, the token upon reading the token from the consumer device.

3. The method of claim 1, wherein the short-range wireless connection is NFC, Bluetooth, or iBeacon, and further comprising the step of causing the checkout system to poll its environment by regularly transmitting an NFC, Bluetooth, or iBeacon signal detectable by NFC, Bluetooth, or iBeacon circuitry within range.

4. The method of claim 1, further comprising receiving and storing, at the device, a plurality of tokens, and wherein the request specifies a type of stored token to display.

5. A method of initiating a financial transaction between a consumer and a merchant at a checkout system, the method comprising:
   monitoring, by the checkout system, for the proximate presence of a consumer device capable of communication over a short-range wireless connection, and having a stored token associated with a remote token-generating server;
   establishing, without action by the consumer, a communication channel between the consumer device and the checkout system over a short-range wireless connection; communicating, by the checkout system to the consumer device over said communication channel, a request to display the stored token, thereby causing the consumer device to display said stored token;
   optically reading, by an optical scanner of the checkout system, the token upon display thereof by the consumer device if the display of the consumer device is within view of said optical scanner; and
   causing completion, by the checkout system, of the transaction.

6. The method of claim 5, wherein the method includes the step of electronically decoding, by the checkout system, the token upon reading of the token from the consumer device.

7. The method of claim 5, wherein the short-range wireless connection is NFC, Bluetooth, or iBeacon, and further comprising the step of causing the checkout system to poll its environment by regularly transmitting an NFC, Bluetooth, or iBeacon signal detectable by NFC, Bluetooth, or iBeacon circuitry within range.

8. The method of claim 5, wherein the request specifies to the device a type of stored token to display.

9. The method of claim 5, wherein the request causes the device to display a message in connection with the stored token.

* * * * *